United States Patent [19]

Howell

[11] Patent Number: 5,406,735

[45] Date of Patent: Apr. 18, 1995

[54] FISHING ROD WITH INTEGRAL LIGHT

[76] Inventor: Bobby D. Howell, 2980 Somerset Rd., Addison, Mich. 49220

[21] Appl. No.: 232,672

[22] Filed: Apr. 25, 1994

[51] Int. Cl.⁶ .............................................. A01K 97/12
[52] U.S. Cl. ................................................... 43/17.5
[58] Field of Search ............................... 43/17.5, 18.1

[56] References Cited

U.S. PATENT DOCUMENTS

| | | | |
|---|---|---|---|
| 2,349,077 | 5/1944 | Comparelli | 43/18.1 |
| 3,017,499 | 1/1962 | Fore | 43/17.5 |
| 4,026,059 | 5/1977 | Ochs | 43/17.5 |
| 4,085,437 | 4/1978 | Hrdlicka | 43/17.5 |
| 4,117,618 | 10/1978 | Utsler | 43/17.5 |
| 4,775,920 | 10/1988 | Seibert | 43/17.5 |
| 5,083,247 | 1/1992 | Robinson | 43/17.5 |
| 5,172,508 | 12/1992 | Schmidt | 43/17.5 |
| 5,182,873 | 2/1993 | Aragon | 43/17.5 |
| 5,276,990 | 1/1994 | Ramirez | 43/17.5 |

Primary Examiner—Kurt Rowan
Attorney, Agent, or Firm—Harold D. Shall

[57] ABSTRACT

A fishing rod including a handle overlying at least a portion of a elongated hollow fiber impregnated plastic rod, with the handle including a battery pack and with a portion of the battery pack received within the hollow rod. A laterally extending opening in the distal end of the handle and in the hollow rod receives a bulb connected by a circuit to the battery pack and a switch carried in the butt of the handle.

1 Claim, 2 Drawing Sheets

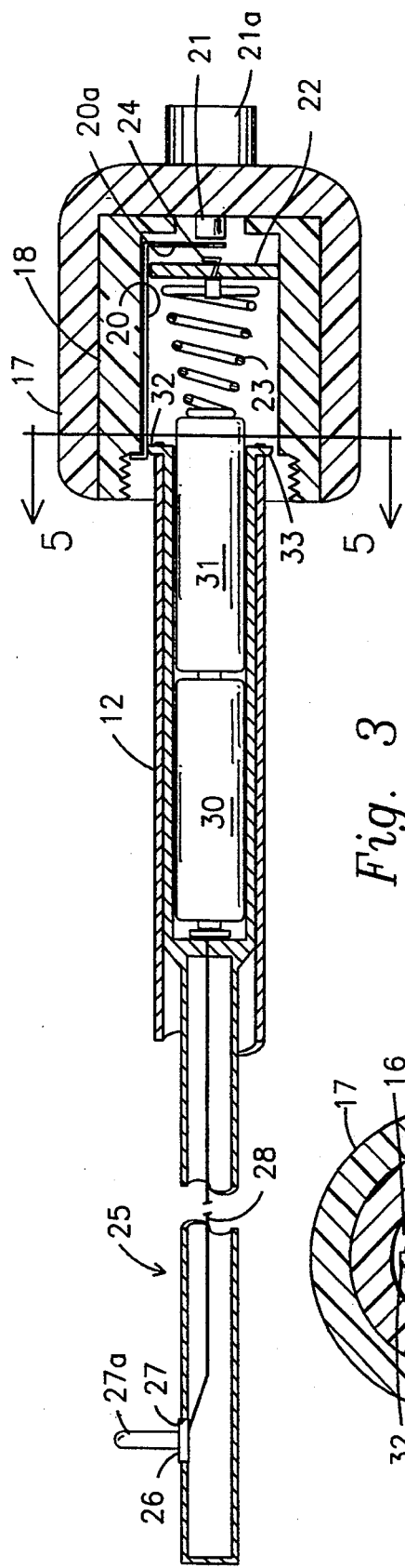
Fig. 3
Fig. 5
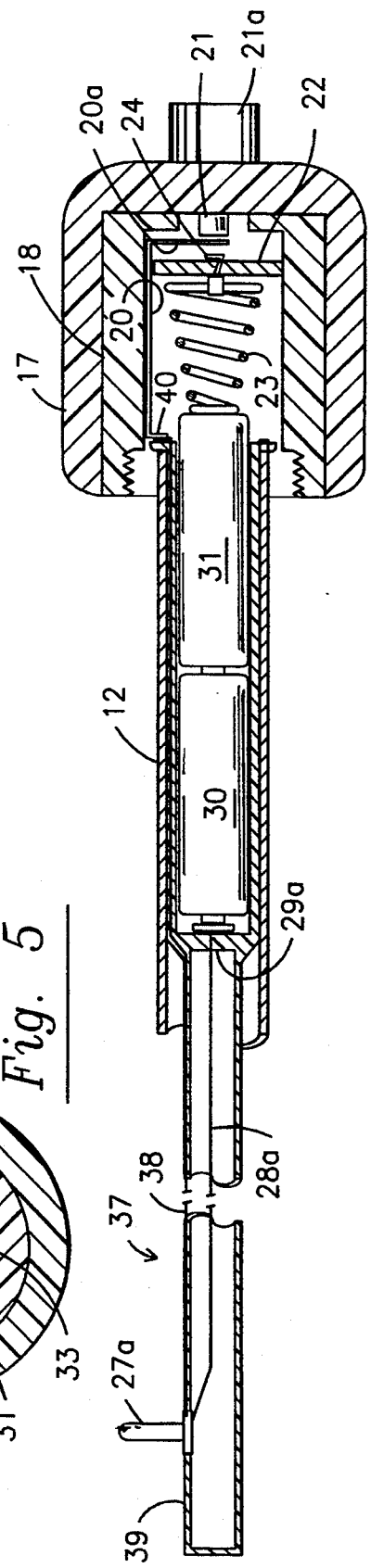
Fig. 4

FISHING ROD WITH INTEGRAL LIGHT

BACKGROUND OF THE INVENTION

1. FIELD OF THE INVENTION

This invention relates to lighted fishing rods generally and more particularly to such a rod wherein the light, batteries and switch are contained within the handle of the fishing rod.

2. DESCRIPTION OF PRIOR ART

Many people fish at night and require a source of light in order to perform many of the needed acts, such as changing a lure or hook, removing line tangles, netting a fish and other activities. Prior art devices such as shown in U.S. Pat. No. 4,780,980 have provided a light in a fishing rod handle; however the light is not positioned where it will shine on the reel to allow a line tangle on the reel to be removed, nor will it shine in the water while the rod is being held in the hand to assist in netting a hooked fish. U.S. Pat. Nos. 4,085,437, 2,565,633 and 2,646,641 show a light in the handle whose field of illumination is improved, but the light takes up so much of the handles extent that the rod blank has little penetration into and support by the rod handle. Other patents such as U.S. Pat. No. 3,017,499 show lights where the batteries are in the handle and the light is at the distal end of the rod blank, but again, the light is not at a location where it is fully useful and the rod blank has little penetration into and support by the rod handle.

3. SUMMARY OF THE INVENTION

The present invention is a fishing rod wherein the handle is hollow and is made from a tubular light weight piece of material such as an aluminum or fiberglass impregnated resin tube on which is secured the reel seat and fore and aft of the reel seat is secured grasping material such as polyurethane foam or cork. The hollow rod blank, made of fiber reinforced resin, is pressed into the tubular piece of material and bonded thereto; the rod blank extending past the middle of the reel seat, so that a strong and integral rod blank and handle structure is created. Into the butt or proximal end of the hollow handle is placed a battery containing battery pack which has a light socket extending laterally therefrom, in the distal end thereof, with such distal end extending into and being received by the proximal end of the rod blank. A small lateral opening is formed in the rod blank, the tubular piece of material and the overlying grasping material, and a light bulb and reflector are placed therein. A sealing cover is secured to the grasping material to waterproof the light. A butt cap containing a switch is threaded on the proximal end of the hollow handle for activating the light circuit.

BRIEF DESCRIPTION OF THE DRAWINGS

FIG. 3 is an enlarged sectional view of a portion of the device as shown in FIG. 2 of an embodiment of this invention with the container portion of the battery pack being made of copper, FIG. 4 is a view like FIG. 3 of another embodiment of this invention wherein the battery pack container portion is made of plastic, and FIG. 5 is a sectional view taken along the line 5—5 of FIG. 3.

DETAILED DESCRIPTION OF THE PREFERRED EMBODIMENT

Figure 1:
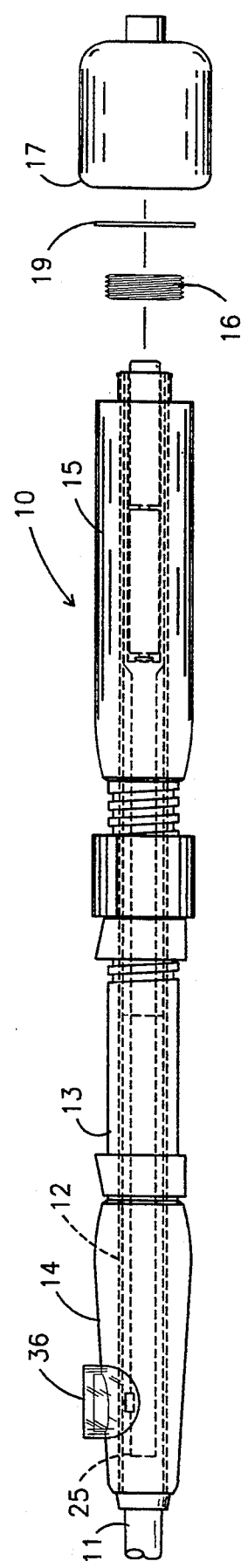
FIG. 1 is a longitudinal view of a fishing rod incorporating this invention with the major portion of the distal end of the rod blank omitted and the butt cap shown separated.

Referring now to FIGS. 1-3 and 5 the handle portion of a fishing rod is shown generally at 10 with a fragment of a hollow rod blank 11 extending outwardly to the left or distally therefrom; the remaining distal portion of the rod blank 11 being omitted and the proximal portion of the rod blank being received in and forming a part of the handle portion 10 as hereinafter more fully described. A lightweight tube 12 made of aluminum, fiberglass or the like extends for the full length of the handle; however; it should be noted that the tube 12 can be omitted and the hollow rod blank 11 elongated and extended for the full length of the handle 10. The rod blank 11 is made from a fiber reinforced plastic such as the well known hollow fiberglass or graphite rod blank which are very strong yet flexible to give the desired characteristics for fishing.

Secured to the periphery of the medial portion of the tube 12 is a conventional reel seat 13, and fore and aft of the reel seat 13 are secured to the tube 12 hand grasping portions, namely a forward grasping portion 14 and a rearward grasping portion 15, which grasping portions are made of suitable material such as closed celled polyurethane foam or cork. Secured to the periphery of the distal end of the tube 12 is an externally threaded member 16 made of a rigid strong material such as polyvinyl chloride (PVC) plastic. Threaded on to the member 16 is a butt cap 17, which butt cap has an internally threaded PVC cylindrical member 18 threaded on to the threaded surface of the member 16. A rubber sealing member 19 is interposed between the cylindrical member 18 and the proximal end of the grasping portion 15 to provide a waterproof seal therebetween.

An electrical contact strip 20 made of copper or the like extends from the proximal end of the threads in the threaded cylindrical member 18 to the right and is bend inwardly at 20a to overly the end of a push button 21 which is molded integrally with the butt cap 17. An insulating disk 22, made of plastic, is secured to the cylindrical member 18 at a position to the left of the inward portion 20a of the contact strip 20, and the proximal end of a coiled compression spring 23 is carried by the disk 22. The spring 23 has a projection 24 extending to the right of the disk 22 and when the protruding portion 21a of the button 21 is pushed inwardly it presses the inward portion 20a of the strip 20 into contact with the projection 24 of the spring 23.

Figure 2:
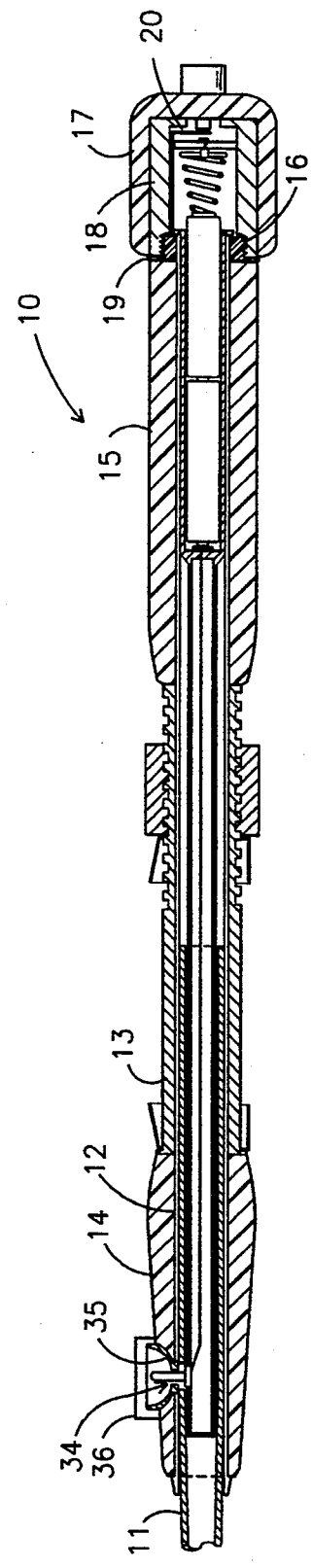
FIG. 2 is a longitudinal cross sectional view of the device of FIG. 1 with the butt cap installed.

As seen in FIGS. 1 and 2, the proximal end of the rod blank 11 extends to approximately the middle of the reel seat 13; however, it should be understood that the rod blank can extend for the full length of the handle 10 with the tube 12 being omitted if desired.

Still referring to FIGS. 1, 2, 3, and 5, extending into the handle 10 from the proximal end thereof is a battery pack 25 which is encased in a tube 25a of conductive material such as copper. A plastic bulb socket 26 is bonded in an opening 27 near the distal end of the tube 25a and a bulb 27a, a high intensity Bi-Pin Bulb, Catalogue No. 272-1150 from Radio Shack, is removable carried by the socket 26. One contact of the bulb 27 is conductively connected to the tube 25a while the other contact of the bulb is conductively connected by a conductor 28 to and through a wall 29 formed in the tube 25a. The conductor 28 contacts the positive end of the forward AAA battery 30 of the battery pack. A second AAA battery 31 is disposed behind the battery 30 and the negative end thereof engages the distal end of the spring 23. The proximal end of the tube 25a has a pair of diametrically opposed tongs 32 and 33 formed thereon which fit into mating slots in the tube 12 to properly index the pack 12 and the tang 31 engages the copper strip 20 so that when the button 21 is depressed the circuit between the bulb 27a and the batteries 30 and 31 is completed thereby lighting the bulb.

The battery pack is shaped and sized so that the forward end thereof is reduced and received within the rod blank 11 and the rearward end thereof is received within the tube 12. If the blank extends for the full length of the handle, then the pack 25 would be shaped accordingly. An opening 34 is formed in the rod blank 11 the tube 12 and the grasping portion 14 to receive the bulb 27a and a reflector 35 for the bulb, and a transparent waterproof cover 36 is secured to the grasping portion to protect and seal the bulb and the reflector from the elements.

Referring now to FIG. 4 wherein a second embodiment of this invention is shown, parts which are like those in FIGS. 1–3 will be given like numerals and will only be explained where the difference from the embodiment of FIGS. 1 to 3 deems it necessary.

The battery pack 37 is made of a plastic tube 39, and a conductor 38 extends distally from the bulb 27a to the distal end of the tube 39 where the conductor 38 engages and inwardly projecting tang 40 formed on the strip 20. A conductor 28a extends from the bulb 27a through a wall 29a to engage the positive end of the battery 30. The battery pack 37 is received in the handle 10 in the same manner as the pack 25 and no further explanation is deemed necessary.

Although the above descriptions relate to presently preferred embodiments, numerous changes can be made therein without departing from the scope of this invention as claimed in the following claims.

What is claimed is:
1. A fishing rod having a light in the handle portion thereof comprising
 a) a hollow fiber impregnated plastic rod,
 b) a rod handle having a longitudinal opening therethrough,
 c) said plastic rod extending at least partially into the longitudinal opening in said handle,
 d) a battery pack containing a battery in said handle with at least the end portion thereof toward said plastic rod received in said plastic rod,
 e) said rod handle and said plastic rod having an aligned laterally extending opening therein,
 f) a light bulb received in said laterally extending opening,
 g) switch means in said rod handle, and
 h) circuit means connecting said bulb, said battery pack and said switch means,
 i) a bulb socket carried by the end portion of said battery pack, with said bulb socket connected to said circuit means, said light bulb extending through said laterally extending opening and received in said bulb socket.

* * * * *